(12) United States Patent
Vaks et al.

(10) Patent No.: US 9,991,837 B2
(45) Date of Patent: Jun. 5, 2018

(54) SYSTEMS AND METHODS FOR VIBRATION AND NOISE MANIPULATION IN SWITCHED RELUCTANCE MACHINE DRIVETRAINS

(71) Applicant: Continuous Solutions LLC, Portland, OR (US)

(72) Inventors: Nir Vaks, Portland, OR (US); Nyah Zarate, Portland, OR (US); Xiaoqi Wang, Portland, OR (US)

(73) Assignee: Continuous Solutions LLC, Portland, OR (US)

( * ) Notice: Subject to any disclaimer, the term of this patent is extended or adjusted under 35 U.S.C. 154(b) by 0 days. days.

(21) Appl. No.: 15/601,823

(22) Filed: May 22, 2017

(65) Prior Publication Data

US 2017/0366128 A1 Dec. 21, 2017

Related U.S. Application Data

(60) Provisional application No. 62/339,686, filed on May 20, 2016.

(51) Int. Cl.

| | |
|---|---|
| *F28F 27/00* | (2006.01) |
| *G05B 5/01* | (2006.01) |
| *H02P 6/10* | (2006.01) |
| *H02P 25/098* | (2016.01) |
| *H02P 25/086* | (2016.01) |
| *H02P 25/092* | (2016.01) |

(52) U.S. Cl.
CPC .......... *H02P 25/098* (2016.02); *H02P 25/086* (2013.01); *H02P 25/092* (2016.02)

(58) Field of Classification Search
CPC . H02P 6/16; H02P 25/098; H02P 6/10; G05B 5/01; F28F 27/00
See application file for complete search history.

(56) References Cited

U.S. PATENT DOCUMENTS

| | | | |
|---|---|---|---|
| 4,961,038 A | 10/1990 | MacMinn | |
| 5,446,359 A | 8/1995 | Horst | |
| 5,461,295 A | 10/1995 | Horst | |
| 5,852,355 A | 12/1998 | Turner | |
| 5,923,141 A | 7/1999 | McHugh | |
| 6,359,413 B1 | 3/2002 | Schulz et al. | |
| 6,498,447 B2 * | 12/2002 | Mann | ............ H02P 25/098 318/400.2 |
| 6,646,407 B2 | 11/2003 | Rahman et al. | |
| 6,922,036 B1 | 7/2005 | Ehsani et al. | |
| 7,009,360 B2 | 3/2006 | Jin-Woo et al. | |
| 7,117,754 B2 | 10/2006 | Neely et al. | |
| 7,119,512 B2 | 10/2006 | Green | |
| 7,885,785 B1 | 2/2011 | Pekarek et al. | |

(Continued)

*Primary Examiner* — Eduardo Colon Santana
*Assistant Examiner* — Cortez Cook
(74) *Attorney, Agent, or Firm* — Kolisch Hartwell, P.C.

(57) ABSTRACT

Systems and methods to manipulate the noise and vibration of a switched reluctance machine (SRM), capable of being implemented in a controller. By use of vibration sensors and a real-time optimizer, the noise and vibration profile of an SRM and associated load can be modified in order to meet multiple control objectives, such as torque ripple mitigation (TRM), harmonic spectrum shaping, and efficiency improvement. The systems and methods can be adapted to high power, high pole count, and high speed applications, and applications where electrical or mechanical imbalance exists.

8 Claims, 7 Drawing Sheets

(56) References Cited

U.S. PATENT DOCUMENTS

| | | | |
|---|---|---|---|
| 8,018,193 B1* | 9/2011 | Pekarek | H02P 6/16 |
| | | | 318/400.15 |
| 8,080,969 B2* | 12/2011 | Koenig | H02P 25/08 |
| | | | 318/432 |
| 9,236,820 B2 | 1/2016 | Mikail et al. | |
| 2002/0109476 A1 | 8/2002 | Kim | |
| 2006/0038531 A1* | 2/2006 | Wakabayashi | H02P 29/50 |
| | | | 318/807 |
| 2014/0210388 A1* | 7/2014 | Ito | H02P 6/10 |
| | | | 318/400.2 |
| 2015/0207439 A1* | 7/2015 | Ye | H02P 25/098 |
| | | | 318/400.23 |
| 2016/0069624 A1* | 3/2016 | Rollins | F04D 25/028 |
| | | | 415/122.1 |
| 2016/0105135 A1 | 4/2016 | Torrey | |

* cited by examiner

SYSTEMS AND METHODS FOR VIBRATION AND NOISE MANIPULATION IN SWITCHED RELUCTANCE MACHINE DRIVETRAINS

CROSS REFERENCE TO RELATED APPLICATIONS

This application claims priority to copending U.S. Application, Ser. No. 62/339,686, filed on 20 May 2016, which is hereby incorporated by reference for all purposes.

STATEMENT REGARDING FEDERALLY SPONSORED RESEARCH OR DEVELOPMENT

The invention described herein was made with government support under U.S. Army Contract W56HZV-15-C-0192. The government of the United States of America may have certain rights in the invention.

BACKGROUND

The present disclosure relates generally to switched reluctance machine ("SRM") controls, and in particular to systems and methods to mitigate and/or manipulate the noise and vibration produced by an operating SRM, including manipulating the noise and vibration profile of the SRM and any associated driveline components. Methods, systems, and SRM controllers implementing these methods are described.

Over the recent decades, the switched reluctance machine has gained much attention in academia, industry, and defense. SRMs have advantages over competing motive technologies, including low production costs due to simple geometry, relatively low materials cost, durability in harsh conditions, and tolerance to phase winding faults. Nevertheless, SRMs can be prone to excessive vibration and acoustic noise, generated by a variety of sources including structural deformation, magnetic torque harmonics resulting from the stator-rotor interaction, machine imbalances, and load-induced imbalances. Vibration can reduce the lifetime of drivetrain and the surrounding components. In addition, the resulting noise may be bothersome to the user and environment, and in some cases indicate the signature of the source of noise.

Known systems and methods of vibration and noise manipulation in SRMs are not entirely satisfactory for the range of applications in which they are employed. Previous research has been conducted on control methods of torque ripple mitigation (TRM) in SRMs. Prior art methods of TRM in SRMs are directed to open-loop control, in which a look-up table based on machine characterization of an ideal SRM model is created off-line and used to modify the current profile to mitigate the torque ripples. However, as open-loop control is predominantly accomplished using parameters that are predetermined prior to implementation, such control has the main drawback of being sensitive to machine parameter variations that arise after the machine characterization has been implemented. This is a critical problem for open-loop control of SRMs, as SRMs are subject to relatively large parameter deviations in implementation and use due to the use of relatively cheap materials, operation over wide range of flux densities, and the non-linear relationship between current waveform and flux density as a function of the rotor position. Therefore, open-loop control that is based on the knowledge of model SRM parameters can become much less effective in reality.

This problem can be somewhat mitigated by using parameters measured for each SRM with its specific load in place. However, such a technique would then limit controller use to the specific SRM and load combination; if any components of the driveline are changed, the parameters would need to be recomputed and the controller updated. Because of this, determining parameters for each specific SRM-load combination isn't realistic for applications requiring the mass deployment of SRMs or where interchangeability of components is desired.

In contrast to open-loop control, closed-loop control uses vibration or noise measurement feedback as a direct input into the controller, replacing the off-line calibrated look-up table. Closed-loop controllers provide benefits such as immunity to machine parameter deviation, real-time monitoring of the SRM's vibratory (or noise) profile, and the ability to implement optimization methods to enable tuning of the SRM while running. However, closed-loop controls tend to be less responsive and less robust at transients resulting from load changes, as the convergence coefficient in the optimization method requires fine tuning at different load conditions beyond the capabilities of existing closed-loop systems. Moreover, the existing current harmonic profiling techniques can only mitigate torque ripples with a harmonic order number higher than the phase number. Closed-loop controllers have no control over lower frequency torque ripples, such as $1^{st}$ and $2^{nd}$ order harmonics. In addition, prior art closed-loop control has been applied for TRM of permanent magnet synchronous machines (PMSMs), including brushless DC motors (BDCMs) only. The inverter topology and system matrices are fundamentally different for a PMSM/BDCM in comparison to an SRM.

Thus, there exists a need for systems and methods for vibration and noise manipulation in switched reluctance machines that improve upon and advance the design of known systems and methods of SRM control. Examples of new and useful systems and methods relevant to the needs existing in the field are discussed below.

Disclosure addressing one or more of the identified existing needs is provided in the detailed description below. Examples of references relevant to systems and methods for vibration and noise manipulation in switched reluctance machine drivetrains include U.S. Pat. Nos. 8,018,193 and 7,117,754.

The '193 patent is directed to a torque ripple mitigation controller with vibration sensor delay compensation. The '754 patent is directed to a torque ripple sensor and mitigation mechanism. Unlike the disclosed invention, both the '193 and '754 patents are directed to torque ripple mitigation in a permanent magnet synchronous machine, do not include mitigation of non-torque induced vibrations such as vibrations from SRM loads or machine imbalances, and do not disclose manipulation of drive currents to accomplish goals other than vibration reduction, such as noise shaping. The complete disclosures of the above patents and patent applications are herein incorporated by reference for all purposes.

SUMMARY

The disclosed invention comprises a closed-loop control algorithm for SRMs that performs vibration and noise manipulation, including torque ripple mitigation (TRM), in real-time. This algorithm can be implemented on an SRM controller. A real-time optimization module employing an adaptive gradient method enhances the responsiveness and robustness of the disclosed control methods and implementing controllers during load transients. The real-time optimization process dynamically generates the optimal set of current harmonics, phase advancement angle, and electromechanical imbalance factor, despite machine parameter variations. The disclosed methods and systems can be utilized in high power, high pole count, and high speed applications, where SRMs have characteristics such as long ramp-up and fall-down times in phase current due to high machine inductance, and high electrical switching frequencies in high pole count and high speed implementations. In addition, the disclosed methods provide a solution to mitigate or manipulate low frequency (first and second order) torque ripple harmonics produced by parameter deviation between each phase and mechanical misalignment in the drivetrain.

Furthermore, the disclosed methods and systems can be utilized to manipulate, rather than minimize, the noise and vibration profile of not only the SRM, but the SRM in combination with its load. Current research is focused only on the reduction of SRM vibration and noise induced by torque ripple. However, the same methods that can be used to reduce torque-induced harmonic vibrations, other machine-induced vibrations, and noise can be used instead to shape, rather than strictly reduce, the harmonic spectrum of the source. By reducing some harmonic orders and adding other harmonic orders, the noise signature of one object can be changed to represent or mimic the noise signature of another object. In addition, by introducing current harmonics, traditional TRM methods are subject to issues of increasing loss and exceeding hardware rating. In this invention, efficiency can be part of the cost function so that the generated current profile will lead the SRM to run at optimal conditions.

According to a first aspect of the disclosed invention, a method for mitigation of machine-induced vibration and noise in a switched reluctance machine drivetrain, the drivetrain including at least a switched reluctance machine rotor and a load mechanically attached to the rotor, comprises driving the switched reluctance machine with a drive current supplied from a closed-loop controller; disposing a vibration sensor relative to the switched reluctance machine drivetrain so that the vibration sensor can measure machine-induced vibrations from the switched reluctance machine drivetrain in at least one axis; measuring the machine-induced vibrations with the vibration sensor; determining the corresponding angular position of the rotor; calculating by a real-time optimization module a modulation signal configured to modify the machine-induced vibrations from the measured machine-induced vibrations and rotor angular position by performing an adaptive gradient method analysis; and incorporating the modulation signal into the drive current by the controller.

In one embodiment, incorporating the modulation signal into the drive current by the controller is performed by a current synthesizer module.

In another embodiment, the adaptive gradient method analysis includes cost function parameters that can be tuned by an objective selector to modify the modulation signal.

In another embodiment, the objective selector modifies the modulation signal to alter the switched reluctance machine drivetrain's noise and vibration profile to a target noise and vibration profile, and target efficiency.

In still another embodiment, calculating the signal configured to modify the machine-induced vibrations further comprises extracting torque harmonic information from the measured machine-induced vibrations.

In another embodiment, the method further comprises determining a base current; computing an electromechanical imbalance factor from the base current and the torque harmonic information; and incorporating the electromechanical imbalance factor into the drive current.

In another embodiment, the method further comprises measuring a phase current feedback from the switched reluctance machine; and determining a phase advancement angle from the torque harmonic information and phase current feedback.

In still another embodiment, incorporating the modulation signal into the drive current further comprises incorporating the phase advancement angle and implementing asymmetric hysteresis current control.

In yet another embodiment, the adaptive gradient method analysis includes an automatically tuned convergence coefficient.

According to a second aspect of the disclosed invention, a system for controlling a switched reluctance machine drivetrain to modify machine vibrations comprises a switched reluctance machine drivetrain comprised of a switched reluctance machine with a rotor and a load, wherein the rotor is mechanically attached to the load; and a controller configured to drive the switched reluctance machine with a drive signal. The controller further comprises a real-time optimization module; a torque estimator module; and a current synthesizer module; a vibration sensor configured and disposed to detect machine-induced vibrations from the switched reluctance machine drivetrain; and an angular position sensing means configured to detect the angular position of the rotor. The real-time optimization module is configured to receive inputs from the vibration sensor and angular position sensing means, determine from the inputs a modulation signal to modify the machine-induced vibrations, and the controller is configured to incorporate the modulation signal into the drive signal.

In one embodiment, the system further comprises an inverter constructed using an asymmetric H-bridge topology, configured to use the drive signal to create a drive current for the switched reluctance machine.

In another embodiment, the inverter implements asymmetric hysteresis current control.

In another embodiment, the real-time optimization module further comprises a harmonic extraction module, a base current estimator, a phase advancement angle module, an electromechanical imbalance factor module, and an adaptive gradient and cost function module.

In still another embodiment, the vibration sensor comprises a piezo-electric sensor, a microphone, or an accelerometer.

In yet another embodiment, the switched reluctance machine is configured to operate as a generator or as a motor.

According to a third aspect of the disclosed invention, a controller for a switched reluctance machine comprises a torque command input; a current sensor configured to measure the phase currents across the switched reluctance machine; one or more vibration sensors configured to measure machine-induced vibrations from a switched reluctance machine drivetrain, the switched reluctance machine drivetrain further comprised of the switched reluctance machine and a load mechanically connected to the switched reluctance machine; an angular sensing means configured to detect the angular position of a rotor of the switched reluctance machine; a real-time optimization module; a torque estimator module; a current synthesizer module; and a current/voltage drive inverter. The real-time optimization module further comprises a harmonic extraction module, a base current estimator, a phase advancement angle module, an electromechanical imbalance factor module, and an adaptive gradient and cost function module. The adaptive gradient and cost function module calculates a modulation signal from the vibration sensor and angular sensing means signals to reduce the measured machine-induced vibration using an adaptive gradient method analysis.

In one embodiment, the real-time optimization module further comprises an objective selector.

In another embodiment, the harmonic extraction module determines torque harmonic information from the measured machine-induced vibrations.

In yet another embodiment, the electromechanical imbalance factor receives a base current from the base current estimator module, and computes an electromechanical imbalance factor from the base current and torque harmonic information.

In still another embodiment, the current/voltage drive inverter is configured using an asymmetric H-bridge topology, and implements asymmetric hysteresis current control.

DETAILED DESCRIPTION

Figure 1:
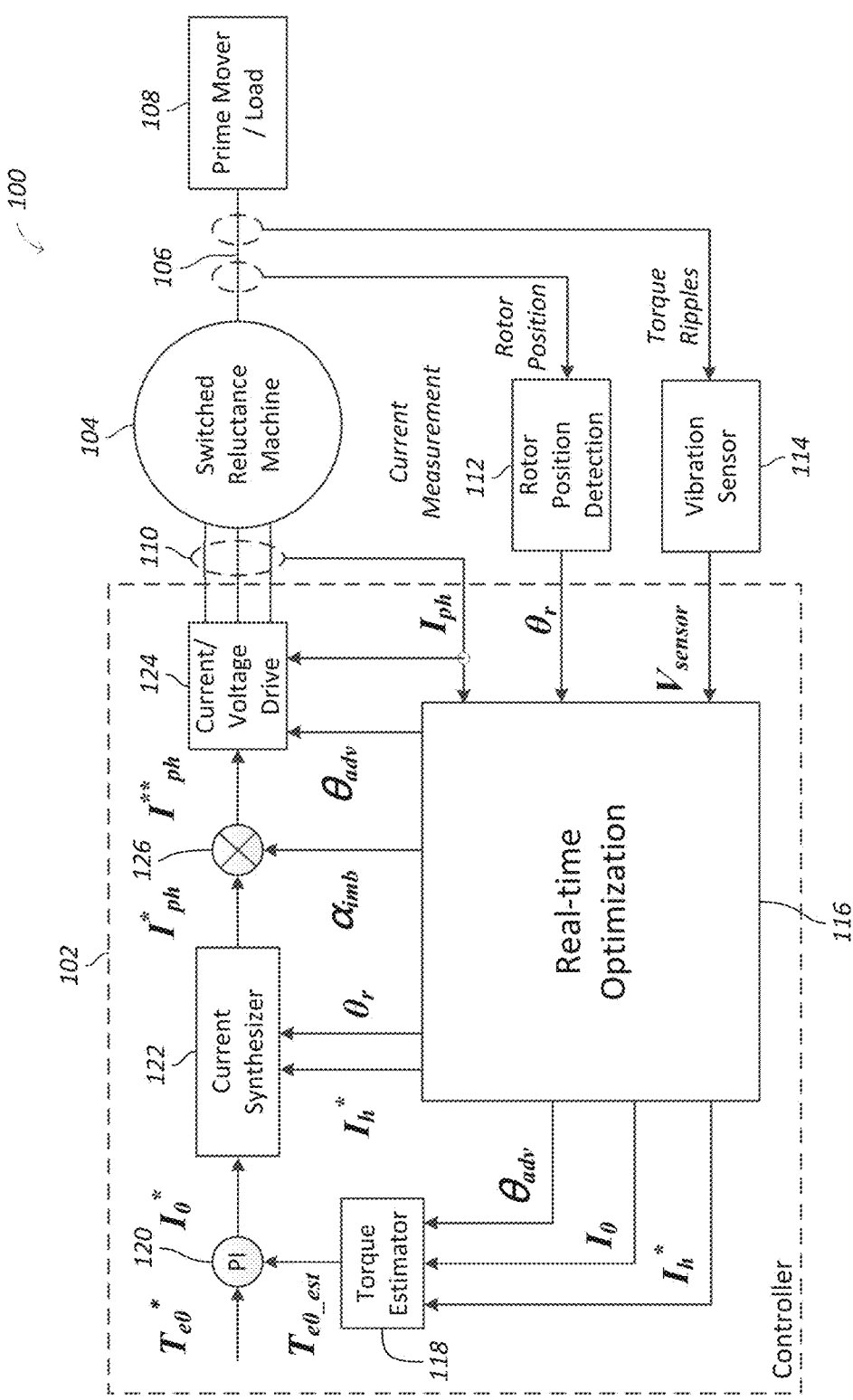
FIG. 1 is a block diagram of a controller implementing the disclosed methods for vibration and noise manipulation for a switched reluctance machine.

The disclosed systems and methods for vibration and noise manipulation in switched reluctance machines will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, every contemplated variation is not individually described in the following detailed description.

Throughout the following detailed description, examples of various systems and methods for SRM noise and vibration manipulation are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Referring to FIGS. 1-7, an example of a system for vibration and noise manipulation for an SRM, system 100, will now be described. System 100 functions to provide a controller for an SRM that implements the method for vibration and noise manipulation for an SRM disclosed herein. The reader will appreciate from the figures and description below that system 100 addresses shortcomings of conventional systems.

For example, system 100 serves to provide a way to manipulate measured vibrations and/or noise generated by an SRM drivetrain, which includes the SRM and any associated load mechanically attached to the SRM. While in operation an SRM and any attached load generates vibrations and/or noise due to various factors such as torque ripples, SRM mechanical imbalance, load imbalance, load changes, load cogging, and other similar factors. These vibrations and/or noise are measured using a vibration sensor, such as a piezo-electric sensor, accelerometer, or micro-phone, preferably placed in proximity to the source of a particular noise or vibration. The sensor signal is processed through a real-time optimization module to determine the current profile for torque ripple mitigation (TRM), or for other control objectives such as harmonic spectrum shaping, noise mitigation and/or manipulation, and efficiency improvement. A phase advancement angle and an electromechanical imbalance factor are also generated from the real-time optimization module and used to improve current tracking and the performance in high power, high pole count, and high speed applications. The real-time optimization utilizes an adaptive algorithm to auto-tune the convergence coefficient to achieve rapid responsiveness and strong robustness during load transient. The control scheme is applicable to both generating and motoring operation of the SRM.

Referring to FIG. 1, system 100 includes a controller 102 and an SRM 104 that includes a rotor 106 with a shaft. A prime mover or a load 108, depending on whether SRM 104 operates as a generator or a motor, is attached to the shaft of rotor 106. The SRM drivetrain is comprised of SRM 104, rotor 106, and load 108. Current measurement devices 110, a rotor position detection device 112, and a vibration sensor 114 are in electrical communication with controller 102. Although SRM 104 shown in FIG. 1 has three phases, the disclosed methods and controller 102 can be configured to work with any arbitrary number of phases and configurations of SRMs.

The construction and operation of SRM 104 is well known in the art. Within SRM 104, the stator and rotor have protrude geometry as poles, and there are windings around the stator poles. The rotor is comprised of a soft magnetic material. As current excitation is provided to the stator windings, the unaligned rotor poles are attracted to the energized stator pole to an aligned position, in which case torque is generated through this process. By sequentially switching the current into each stator phase winding so that the magnetic field leads the position of the rotor, the rotor rotates due to the electromagnetic torque created by the variation of reluctance and the controlled stator phase currents. Controller 102 receives rotor position feedback via rotor position detection device 112, which facilitates controller 102 in timing the switching between stator phases.

SRM 104 is connected to a prime mover or a load 108 via a shaft extending from rotor 106. As rotor 106 and its corresponding shaft rotate, mechanical energy is transferred via the shaft between load 108 and rotor 106 of SRM 104. Load 108 can be a prime mover when SRM 104 is in generating mode, or a driven load when SRM 104 is operated as a motor.

Current measurement devices 110 are wired across the stator winding phases, to detect the current flowing through each phase. Such measured currents are fed back to controller 102 to enable controller 102 to determine and tweak the performance of SRM 104, such as ensuring that a commanded torque is being delivered, as well as to detect potential electrical faults such as a short in the windings, or a stalled motor that could result in an over current condition within controller 102. Measured currents can also be used to detect the angular position of rotor 106, as detailed further below. Current measurement devices 110 can be implemented using any known method of detecting current flow, such as detection coils. Such functionality may be implemented within controller 102, or as a discrete component or components external to controller 102.

To correctly and smoothly operate SRM 104, controller 102 must know the angular position of rotor 106 at all times. Rotor position information $\theta_r$ obtained from a rotor position detection device 112 is fed to controller 102 for use in timing stator winding excitation, as described above. SRM 104 may equipped with one or more rotor position detection devices 112, which may be implemented using an encoder, resolver, hall-effect sensors, or any other suitable device that can accurately detect the angular position of rotor 106. In other embodiments, rotor position detection can be realized by sensorless techniques based on the feedback of the phase current (as detected by current measurement devices 110) and voltage measurements $I_{ph}$ and $V_{ph}$, respectively, with appropriate calculations performed in controller 102. In such embodiments, a discrete rotor position detection device 112 is unnecessary.

It should be understood that, as stated in the claims, "angular position sensing means" and "angular sensing means" correspond to any device or technique for determining the angular position of rotor 106, including a discrete detection device as listed above, and/or methods of determining rotor position described above, including phase current and voltage detection, back EMF measurement techniques, or any other device or method now known or later developed that provide a suitably accurate indication of the angular position of rotor 106. Such means will work while SRM 104 is in operation, and is also fast enough to work with the timing requirements of controller 102 necessary to drive SRM 104 for its intended application.

For most embodiments, vibration sensor 114 is installed upon or in the proximity of SRM 104, to measure vibrations and noise produced by SRM 104. Other embodiments may place vibration sensor 114 at locations more proximate to or upon load 108, where manipulation of vibrations and/or noise experienced by the whole of system 100 is desired. Vibration sensor 114 transforms the detected vibration and noise into a voltage signal. In preferred implementations vibration sensor 114 outputs a varying analog voltage signal corresponding to the amplitude of the measured vibrations and/or noise. Where vibration sensor 114 is placed on or proximate to SRM 104, the voltage signal will contain harmonic components that represent the torque ripple induced by SRM 104, as well as lower-order harmonics induced by machine and system imbalances. A conditioning circuit may be used to amplify and filter the direct output signal of vibration sensor 114, and to form the sensor signal $V_{sensor}$ that is fed to controller 102. This condition circuit may be implemented as part of controller 102, as part of vibration sensor 114, or as a discrete component.

As mentioned above, vibration sensor 114 can be implemented using one or more piezo electric devices, microphones, hall-effect sensors, accelerometers, gyroscopes, MEMS sensor, or any other suitable technology now known or later developed that allows for accurate vibration and/or noise detection and measurement. Moreover, system 100 may be equipped with multiple vibration sensors 114 to measure harmonics in multiple axes, and/or from multiple locations, viz. both SRM 104 and load 108.

Controller 102, as a closed-loop controller, receives as an initial input a torque command from the user of system 100, and then drives the SRM based on the commanded torque in combination with measurement feedbacks, aiming to achieve user commands and control objectives such as torque ripple mitigation (TRM) of the SRM. The controller receives the commands of average torque $T_{eo}*$. In addition, the controller receives the measurement feedback of phase currents $I_{ph}$, rotor position $\theta_r$, and vibration sensor signal $V_{sensor}$ that represents the torque ripple induced by the SRM. In response to these inputs, the controller regulates the phase currents in stator coils to generate the desired torque in the SRM.

The various modules comprising controller 102 are shown in the region circled by the dotted line in FIG. 1. Functional modules of controller 102 include a real-time optimization core 116, a torque estimator 118, a PI controller 120, a current synthesizer 122, and a current/voltage drive 124. These modules can be implemented using micro-processors, digital signal processors (DSPs), field-programmable gate arrays (FPGAs), conventional discrete components, or any other suitable implementation technique now know or later developed, including in combination with existing power electronic drive boards. In one preferred embodiment, controller 102 is implemented as a discrete electronic component, often known as an electronic speed controller (ESC), which can be used with various SRMs so long as the phase configuration of controller 102 matches that of SRM 104, e.g. three phase SRM to three phase controller. It should also be appreciated that controller 102 can be implemented to drive an SRM 104 with any arbitrary number of phases. In another preferred embodiment, controller 102 can be physically integrated with either SRM 104, or another component.

Figure 2:
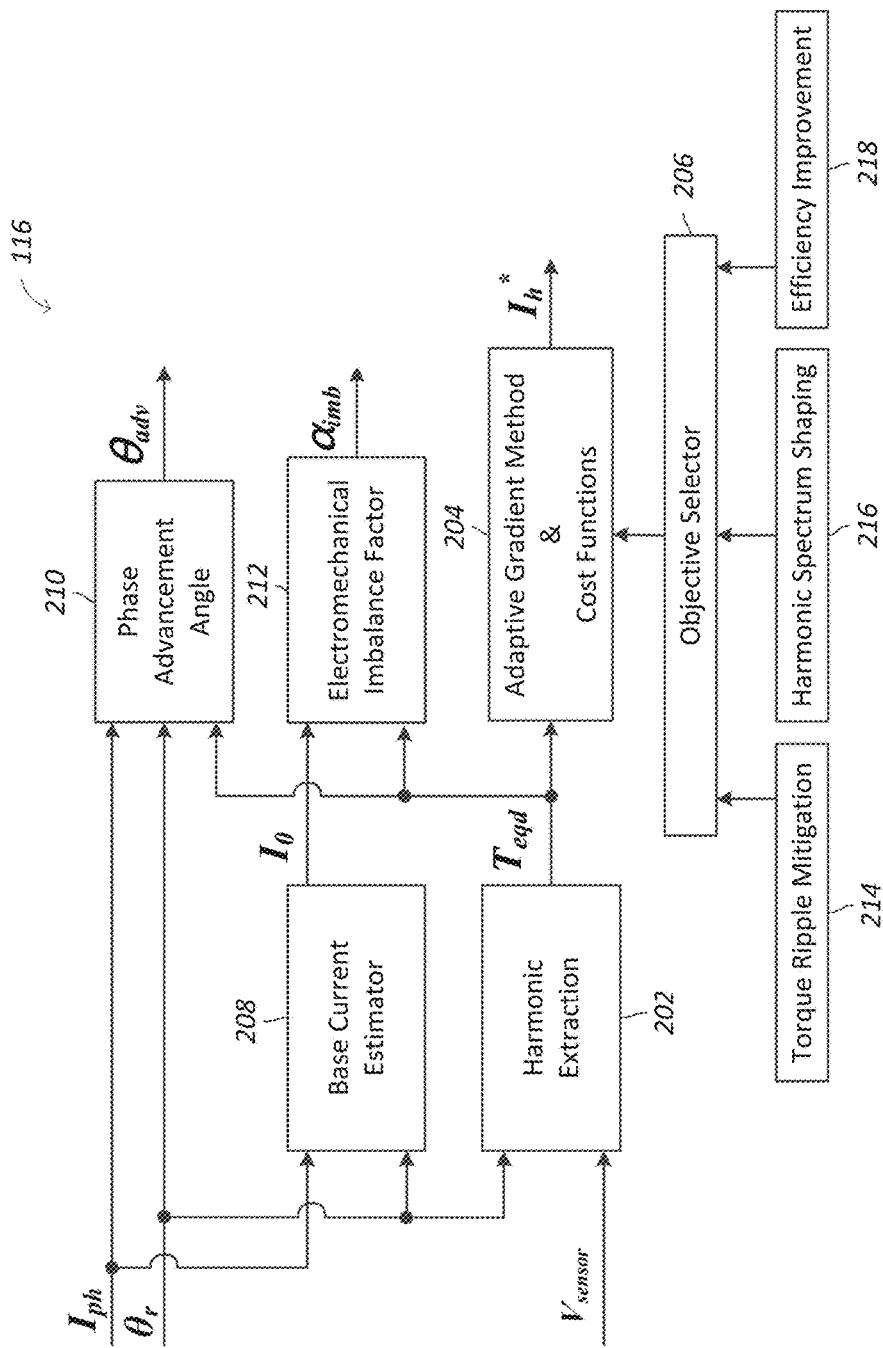
FIG. 2 is a block diagram of the controller shown in FIG. 1 depicting the internal components of the real-time optimization module.

A detailed breakdown of the module components of real-time optimization core 116 is shown in FIG. 2. Real-time optimization core 116 function modules include a harmonic extraction module 202, an adaptive gradient method module 204, an objective selector module 206, a base current estimator 208, a phase advancement angle module 210, and an electromechanical imbalance factor module 212. As with controller 102, real-time optimization core 116 can be implemented using discrete components, microprocessors, embedded controllers, ASICs, FPGAs, DSPs, or any other similarly suitable technology now known or later developed.

The following table shows the signal notation of the controller and each of the function modules depicted in FIGS. 1 and 2:

| Symbol | Description |
|---|---|
| $T_{e0}^*$ | Average torque command |
| $T_{e0\_est}$ | Estimated average torque |
| $I_0^*$ | Base current command |
| $I_0$ | Estimated base current |
| $I_h^*$ | Harmonic current command |
| $I_{ph}^{**}$ | Phase current command with correction |
| $I_{ph}^*$ | Phase current command |
| $I_{ph}$ | Phase current feedback |
| $\theta_{adv}$ | Phase advantage angle |
| $\theta_r$ | Rotor position feedback |
| $\alpha_{imb}$ | Electromechanical imbalance factor |
| $T_{eqd}$ | Torque harmonic content |
| $V_{sensor}$ | Vibration sensor signal |

In harmonic extraction module 202, the vibration sensor signal $V_{sensor}$ and rotor position $\theta_r$ are supplied as inputs, and the torque harmonic information $T_{eqd}$ is generated as an output. The sensor signal $V_{sensor}$ is effectively the result of the torque ripple passing through a transfer function, and the magnitudes of their harmonic components have a linear proportional relationship. By applying harmonic extraction methods, such as Fast Fourier Transform and Fourier Series Decomposition, to the sensor signal $V_{sensor}$, torque harmonic content $T_{eqd}$ that represents the even and odd torque harmonics is obtained. Within the harmonic extraction methods, the detected rotor position is used to calculate the cosine and sine values of the orders of harmonics that are of interest. In addition, a Leaky Integrator method can also be used to extract the harmonic components in a less computationally costly manner. The Leaky Integrator is a method to integrate the product of sensor signal $V_{sensor}$ and cosine (or sine) values that represent different harmonic components, so that the outcome of the Leaky Integrator is the integration of different harmonic components.

While the foregoing refers to the extracted information as torque harmonics, it should be appreciated here and in the following discussions that these harmonics are not necessarily direct torque-induced vibrations coming from SRM 104, but instead any vibrations intended to be measured by vibration sensor 114, including torque-induced, machine imbalance-induced, load-induced, and any other possible source of vibration experienced nearly anywhere in the drivetrain of SRM 104. The drivetrain of SRM 104 includes any load or loads attached to SRM 104. In this respect, "SRM drivetrain" should be understood to mean the combination of SRM 104, rotor 106, as well as any attached load 108. The measured vibrations, and the vibration source, will depend upon the position of vibration sensor 114. In some cases, the extracted information may relate to vibration harmonics resulting from the interaction of SRM 104, and its torque- and imbalance-associated vibrations, with load 108 and its own imbalances and response to torque-induced vibrations. In some cases, particularly when SRM 104 is configured to operate as a generator, the extracted harmonics may include vibrations (torque-induced and/or otherwise) from a prime mover attached to the shaft of rotor 106.

In the adaptive gradient method module 204, the torque harmonic content $T_{eqd}$ is provided as input, and the harmonic current command $I_h^*$ is generated as output. The harmonic current command $I_h^*$ represents the even and odd current harmonics of different orders that are associated with the torque harmonics. The gradient method utilizes a convergence coefficient to control the rate at which the gradient method reaches an optimal current command for modulating or reducing the measured vibrations, as well as one or more cost functions for selecting particular harmonics to modulate, e.g. $3^{rd}$, $6^{th}$, $9^{th}$, $12^{th}$, that are defined by objective selector 206 and are calculated in terms of torque harmonic content $T_{eqd}$. The system matrix in the gradient method is derived based on machine parameters. Although the machine parameters can be characterized at arbitrary load (unsaturated or saturated) conditions, the derived coefficients in the gradient method can be used for operation under any load condition. The convergence coefficient in the gradient method defines the direction and steepness of the convergence, with the coefficients also acting as scaling factors to compensate the proportional gains between the sensor signal $V_{sensor}$ and the actual torque ripples. An adaptive auto-tuning algorithm based on the change of torque harmonic content $T_{eqd}$ is applied to find and tune the optimal convergence coefficient for the gradient method so that the direction and steepness of the convergence can be adjusted appropriately at various load conditions, and also to accommodate variances in a given SRM 104's physical characteristics.

In the objective selector module 206, control objective inputs can include torque ripple mitigation 214 (TRM), harmonic spectrum shaping 216, and efficiency improvement 218. Each control objective input is designed to select and/or tune one or more different cost functions, to be utilized as an input by the adaptive gradient method as described above. For example, torque ripple mitigation 214 is selected as the priority objective for most applications where reduction of vibrations and noise resulting from the operation of SRM 104 is desired. However, other objectives can be selected as priorities. When harmonic spectrum shaping 216 is selected as an objective, instead of adaptive gradient method module 204 acting to minimize all torque ripple harmonic content to zero, the algorithms employed in adaptive gradient method module 204 are tuned to different values than would be used for TRM, so that instead the noise signature of one object can be changed to represent or mimic the noise signature of another object. When efficiency improvement 218 is the selected objective, the adaptive gradient method module 204 is tuned to instead put efficiency optimization over other objectives. Parameters ideal for efficiency are selected for the cost function so that the generated current profile takes account for the increased RMS loss and switching loss to meet user-defined efficiency constraints.

In the base current estimator module 208, the phase current feedback $I_{ph}$, and rotor position $\theta_r$ are provided as inputs, and the estimated base current $I_0$ is calculated as output. The rotor position $\theta_r$ is used to identify the excitation windows that define the beginning and ending moments for each phase excitation. The estimated base current $I_0$ is calculated from the mean value of the phase current within the excitation window.

In the phase advancement angle module 210, the phase current feedback $I_{ph}$, rotor position $\theta_r$, and the torque harmonic content $T_{eqd}$ are provided as inputs, and the phase advancement angle $\theta_{adv}$ is generated as output. Since the phase current cannot change instantaneously from turn on to desired value, or vice versa, in an inductive circuit, the actual current waveform has a "tail" when it raises and falls. Particularly, for high power, high pole count, and high speed applications, the "tail" is relatively long due to high inductance and high electrical frequency. The phase advancement angle $\theta_{adv}$ is applied so that the phase current reaches desired value and contains critical current harmonic content, especially when current harmonics are present. Since the phase advancement angle $\theta_{adv}$ is added only to the beginning of the excitation window of each phase, it simplifies and accelerates the real-time auto-tuning process in order to receive optimal current tracking.

In the electromechanical imbalance factor module 212, the torque harmonic content $T_{eqd}$ and the estimated base current $I_0$ are provided as input, and the electromechanical imbalance factor $\alpha_{imb}$ is generated as output. Due to the deviation of machine parameters, including physical variations introduced in the materials and construction of SRM 104, in each phase, even with the identical phase current, the torque production in each phase can be different, with slight variances. This imbalance introduced by parameter deviation and the mechanical misalignment in the drivetrain can create additional low frequency (e.g. first or second order) torque ripple harmonics in the system. The electromechanical imbalance factor $\alpha_{imb}$ is calculated based on instant feedback of the torque ripples, and used to compensate the imbalance in electrical domain and mechanical domain. Unlike most electric machines such as PMSMs and induction machines where phase windings are inter-connected, since each phase in SRM 104 is independent from the others, an imbalanced set of phase currents can be applied to counteract first and second order vibrations stemming from sources other than torque ripple.

Referring back to FIG. 1, the torque estimator module 118 receives the harmonic current command $I_h^*$, estimated base current $I_0$, and the phase advancement angle $\theta_{adv}$ as inputs, and the estimated average torque $T_{e0\_est}$ is calculated as output. Machine parameters measured at various load conditions are used to derive the system matrices in the calculation of the estimated average torque. Depending upon the nature of the machine parameters, these parameters can be measured prior to implementing system 100 for a specific combination of SRM 104 and load 108, can be estimated for a particular class of SRM 104 for which controller 102 is specifically designed, or can be measured in real time, possibly with suitable sensor equipment. The estimated average torque $T_{e0\_est}$ is compared with the average torque command $T_{e0}^*$ from the user of system 100 in PI controller 120 to obtain the base current command $I_0^*$. A speed control loop can be added if a speed command is required. The speed feedback can be calculated by the time derivative of the rotor position feedback $\theta_r$.

PI controller 120 is a proportional-integral closed-loop controller, the nature and implementation of which is well known in the prior art. PI controller 120 takes at least two coefficients: the proportional coefficient, which governs the degree to which PI controller 120 acts upon the difference between the estimated average torque $T_{e0\_est}$ and the average torque command $T_{e0}^*$ (the control error) in modifying the base current command $I_0^*$ so that the estimated average torque $T_{e0\_est}$ is brought approximately equal to the average torque command $T_{e0}^*$, and the integral coefficient, which accounts for historically accumulating control error by increasing the correction to the base current command $I_0^*$ in proportion to greater control errors that last longer. Thus, a greater P coefficient results in a more dramatic correction to a measured difference between the user command and actual average torque output by SRM 104, and a greater I coefficient results in a faster correction when each iteration of PI controller 120 results in a continuing control error. If I is too high, PI controller 120 may overshoot and oscillate around the average torque command $T_{e0}^*$ point. Depending on applications, PI controller 120 can be implemented as a PID loop, standing for proportional-integral-derivative, with the D coefficient acting as a clamping factor to increase the control loop stability. It will be appreciated by a person skilled in the relevant art that PI controller 120 provides the base function of controller 102 to enable it to bring SRM 104 to a user-commanded torque and keep SRM 104 at that commanded torque despite transient changes in load 108. Because it receives an average torque command and an average torque estimate, PI controller 120, however, does not in itself provide any significant mitigation or manipulation of machine-induced harmonics.

In the current synthesizer 122 module, the harmonic current command $I_h^*$, base current command $I_0^*$, and rotor position $\theta_r$ are fed as inputs, and the phase current command $I_{ph}^*$ is generated as output. The phase excitation window defines the beginning and ending moments for each phase excitation. They are by default determined by the number of phases, and evenly phase-shifted for each phase. The harmonic current command $I_h^*$ represents a set of even and odd harmonic component magnitude. These harmonic components are multiplied by the associated cosine and sine values of the rotor position $\theta_r$ with different orders, and then summed with the base current command $I_0^*$ to generate a combined phase current waveform. Such combined phase current waveform is further used to form the individual phase current command $I_{ph}^*$ for each phase by multiplying it with the phase excitation windows. The phase current command $I_{ph}^*$ for each phase is further multiplied 126 with the electromechanical imbalance factor $\alpha_{imb}$ to obtain the phase current command with correction $I_{ph}^{**}$.

In the current/voltage drive module 124, the phase current $I_{ph}$ is regulated according to the command $I_{ph}^{**}$, with the phase advancement angle $\theta_{adv}$ to activate each phase before its excitation window starts. Current and voltage control techniques such as delta hysteresis and PWM control can be used to generate switching signals to the power electronic switches such as MOSFETs and IGBTs. Particularly, in high power, high pole count, and high speed applications, due to the large phase voltage of the SRM, the rates of current changes at switch on and off period can be greatly different. Therefore, an asymmetric hysteresis current control is implemented to improve current tracking, in which the turn-on and turn-off bandwidths are different so to put more restriction on the faster changing current direction. By doing so, the current overshoot can be reduced and the tracking of the current command can be improved.

Figure 3:
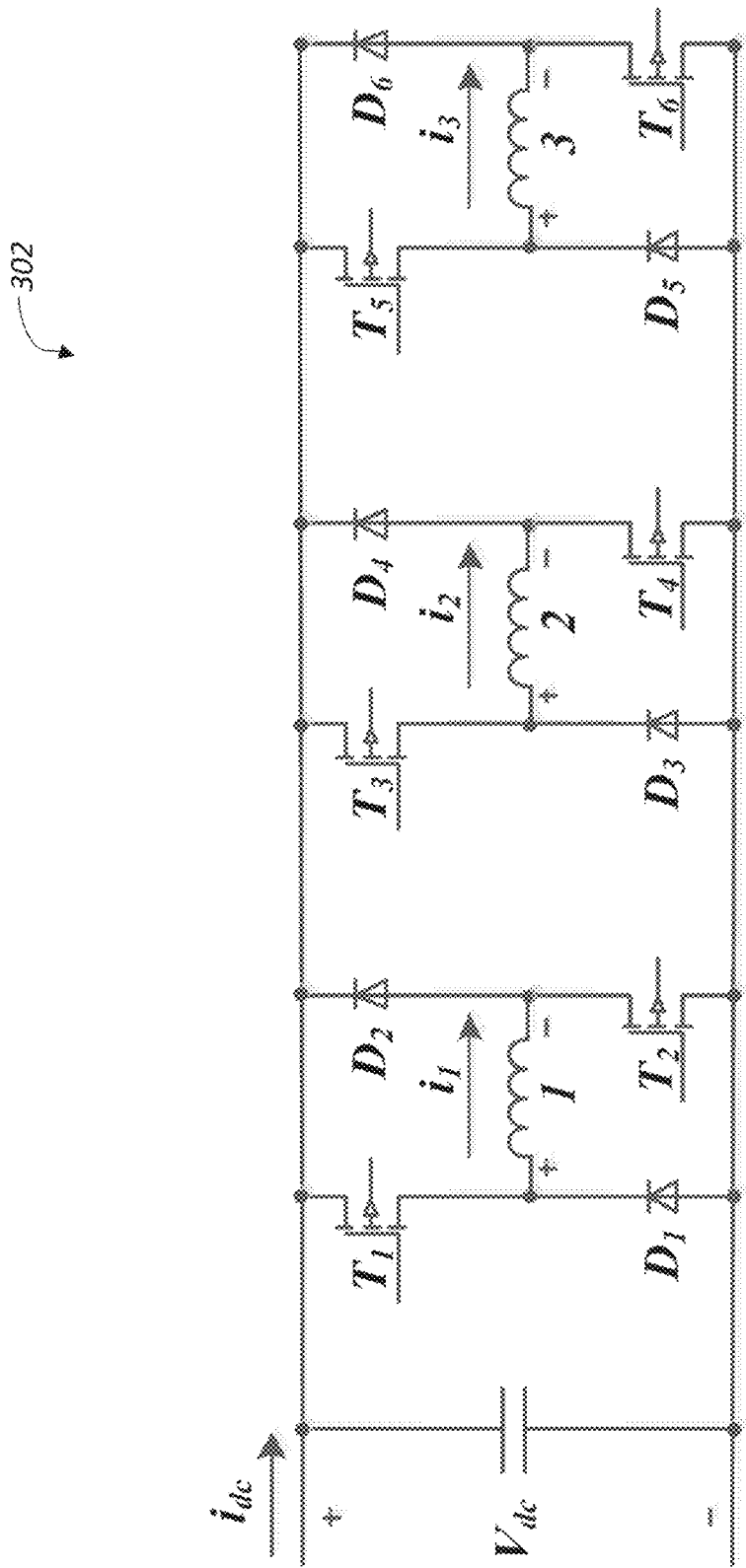
FIG. 3 is a schematic diagram of the inverter topology of the current/voltage drive of the SRM controller shown in FIG. 1.

Turning to FIG. 3, the topology of a preferred embodiment of the inverter portion of current/voltage drive module 124 is shown. Inverter 302 is constructed with an asymmetric H-bridge module for each phase. Although inverter 302 is depicted with three phases, this topology is applicable to an arbitrary number of phases. To reduce switching losses, a soft switching technique can be applied. Soft switching is a method that keeps one leg (top or bottom) of inverter 302 always closed and applies switching events to the other leg during the phase excitation window. The various switching gates $T_1$-$T_6$ are controlled by portions of current/voltage drive module 124 in response to the current rotor 106 angle and phase currents, to ensure the correct phase of stator windings is energized at the correct time to keep SRM 104 moving properly as commanded.

Figure 4:
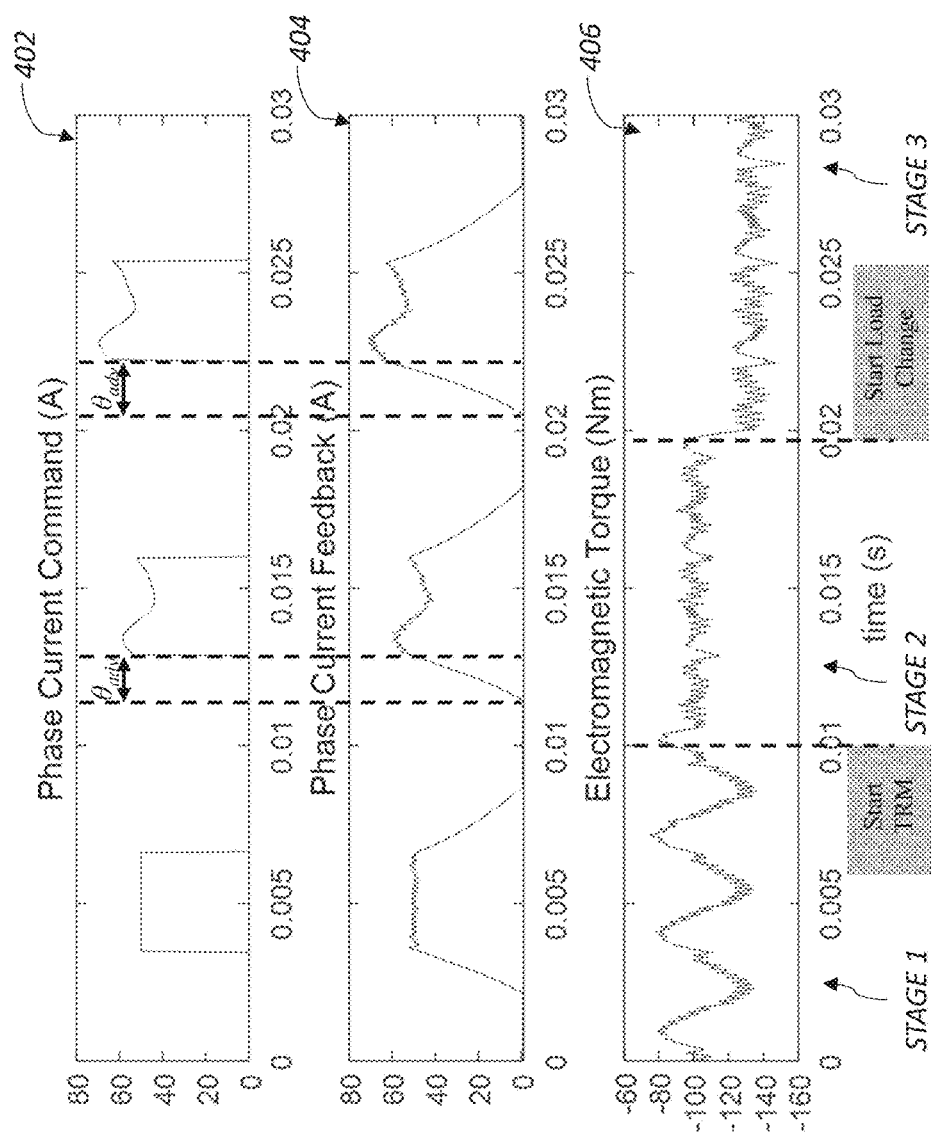
FIG. 4 is a series of graphs depicting the changes in current command, current feedback, and electromagnetic torque, when the disclosed methods for vibration and noise manipulation for an SRM are implemented, and when a load change is incurred.

FIG. 4 is a plurality of simulation waveforms of the SRM drive system 100 shown in FIG. 1 with a commercially available 3-phase 12/8 configuration SRM. Waveform 402, captioned "Phase Current Command," illustrates the phase current command $I_{ph}^*$ for one phase. The phase current command $I_{ph}^*$ is a combination of base current $I_0^*$ and harmonic currents $I_h^*$ that are commanded to mitigate torque ripple. Waveform 404, captioned "Phase Current Feedback," illustrates the phase current measurement $I_{ph}$ from the SRM stator phase coil. Waveform 406, captioned "Electromagnetic Torque," illustrates the electromagnetic torque generated by the SRM. There are three stages being studied in FIG. 4. The first stage is traditional operation without torque ripple mitigation (TRM). The second stage is to enable the TRM control algorithm to mitigate the $3^{rd}$ and the $6^{th}$ order torque ripple harmonics. The third stage is to start a load change from—100 Nm to—130 Nm, with TRM enabled. These three stages are indicated in FIG. 4.

From stage 1 to stage 2, as TRM is enabled, the torque ripples are reduced significantly and rapidly by using the adaptive gradient method. The phase advancement angle $\theta_{adv}$ is calculated in real-time and added prior to the excitation window of each phase so that the actual phase current is activated in advance to contain critical harmonic content and achieve optimal torque ripple mitigation result. From stage 2 to stage 3, during the load condition change, the adaptive gradient method shows great responsiveness and robustness to track the torque command while performing TRM. The phase advancement angle $\theta_{adv}$ increases automatically according to the load change.

Figure 5:
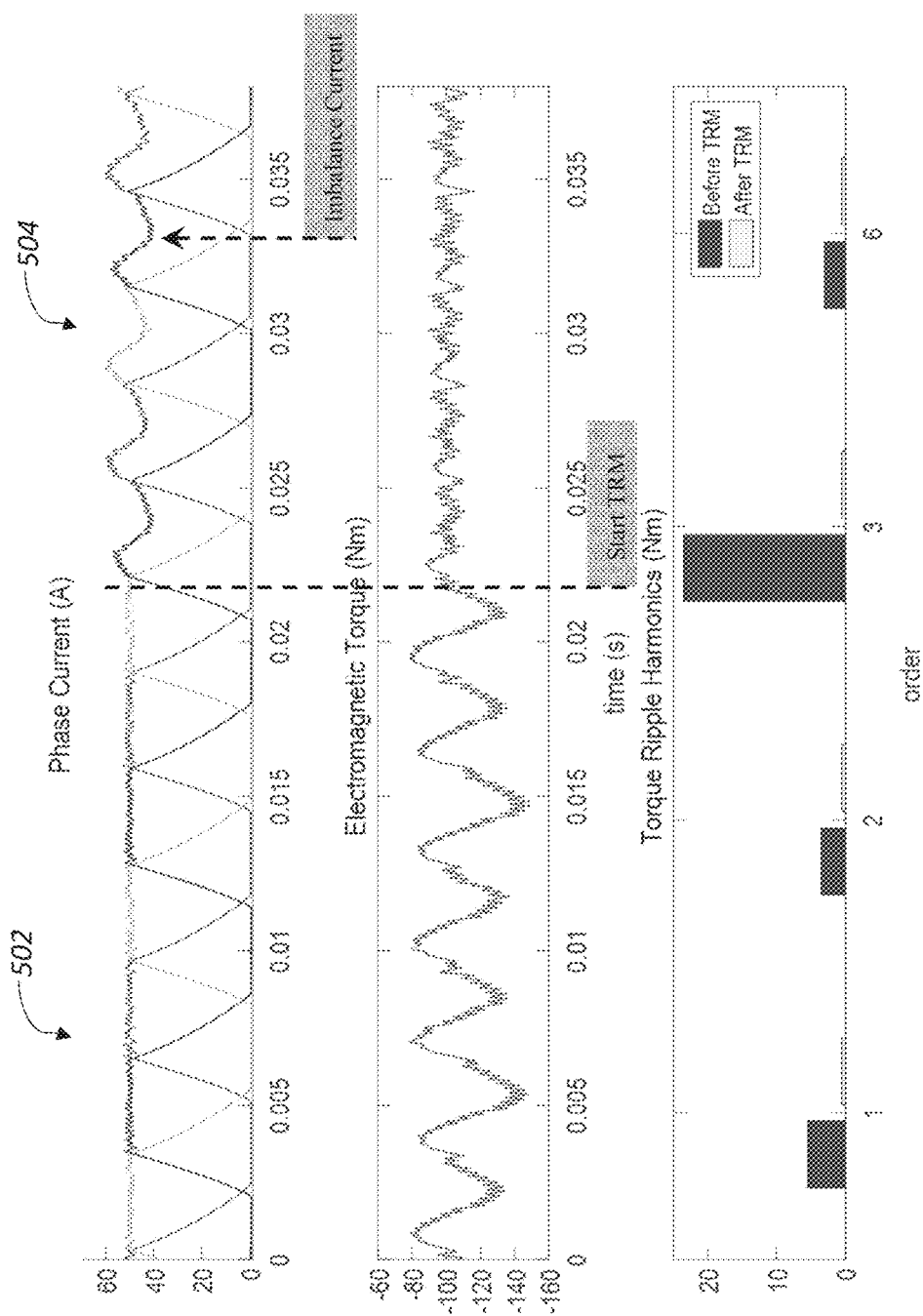
FIG. 5 is a series of graphs depicting changes to phase current, electromagnetic torque, and torque ripple harmonics when the disclosed methods for vibration and noise manipulation for an SRM are implemented, including imbalance correction.

FIG. 5 shows the waveforms of three phase current feedback, electromagnetic torque, and torque ripple harmonic spectrum analysis of the torque waveform. The purpose of this figure is to show the importance and effectiveness to apply electromechanical imbalance correction along with the TRM control algorithm. For a given SRM 104, torque harmonic orders start with the number of phases, viz. a three phase SRM will have $3^{rd}$ order harmonics relative to a single rotation of rotor 106. In other words, while an imbalance in rotor 106 will be typically experienced as a first order vibration (one cycle per revolution of rotor 106), torque-induced harmonics in a three-phase SRM 104 will be experienced as three cycles per revolution of rotor 106, each pulse corresponding to one phase, thereby creating $3^{rd}$ order harmonics relative to the rotation of rotor 106. Three phase SRMs will also typically have additional higher order harmonics based on multiples of three, e.g. $6^{th}$, $12^{th}$ order. Likewise, a machine with four phases would experience initial torque harmonics as $4^{th}$ order relative to each rotation of rotor 106. In contrast, imbalances can be experienced as first order harmonics, which may necessitate correction to only one or two phases of the stator windings, and then only when rotor 106 is at specific angular positions.

There are two stages in FIG. 5. In the first stage 502, the SRM is operating without TRM. Three phase balanced current is applied to the SRM, however electromechanical imbalance is present in this case so that there is significant $1^{st}$ and $2^{nd}$ order (lower than the phase number of the SRM) torque ripple harmonics in the system. In the second stage 504, the TRM control algorithm is enabled along with electromechanical imbalance correction. Rather than applying a balance set of 3-phase current, imbalance current in one of the phases is applied to compensate the electromechanical imbalance in torque ripples. As a result, not only the $3^{rd}$ and the $6^{th}$ order torque ripple harmonics are mitigated by injecting current harmonics, but also the $1^{st}$ and the $2^{nd}$ order torque ripple harmonics are minimized by using electromechanical imbalance correction.

Figure 6:
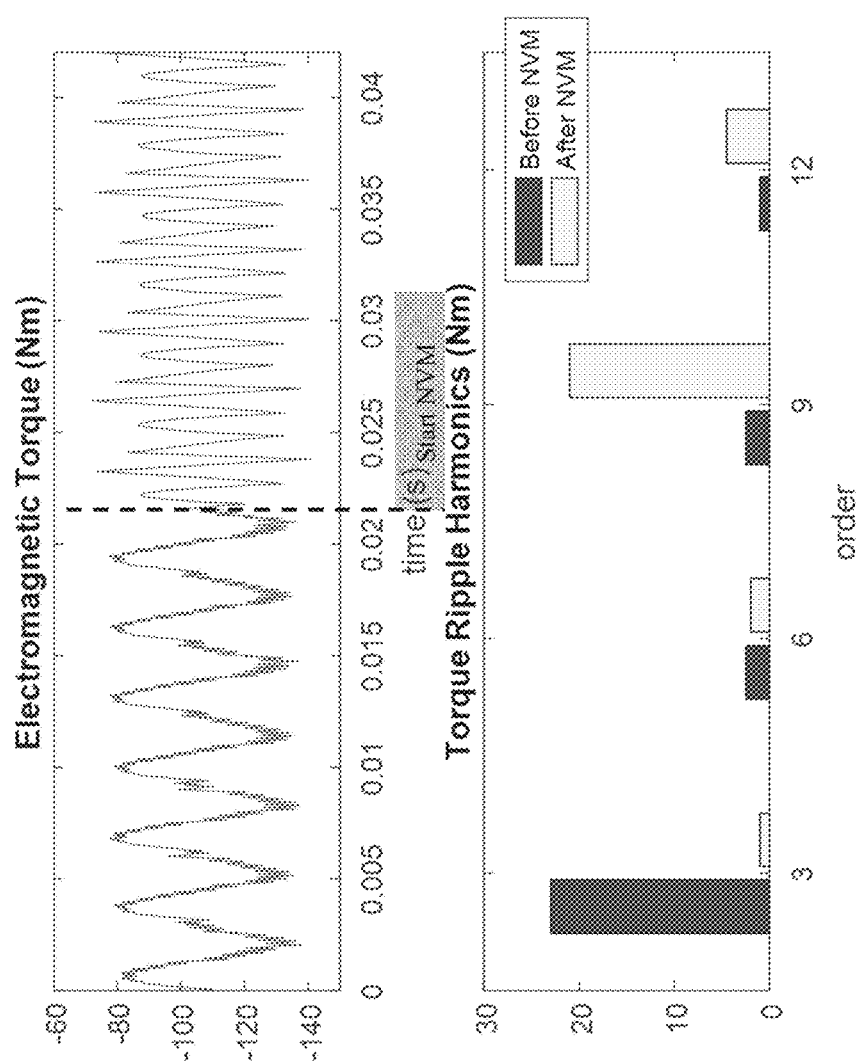
FIG. 6 is a series of graphs depicting changes to electromagnetic torque and torque ripple harmonics when the disclosed methods for vibration and noise manipulation for an SRM are implemented, with the target being manipulation of specific harmonics.

FIG. 6 shows the waveform of electromagnetic torque, and its harmonic spectrum analysis, to illustrate how the disclosed systems and methods can be used to manipulate the harmonic spectrum of SRM 104, rather than reduce or mitigate torque and imbalance noise and vibrations. The noise and vibration manipulation (NVM) starts at the center as indicated in the figure. Instead of torque ripple mitigation, the objective of NVM becomes harmonic spectrum shaping. Therefore, in the torque waveform, the low frequency torque ripples are changed to higher frequency ripples after the NVM is enabled. From the harmonic spectrum analysis, it shows the distribution of the $3^{rd}$, $6^{th}$, $9^{th}$ and $12^{th}$ order harmonics before (left) and after (right) NVM is enabled. As can be seen, there are mostly $3^{rd}$ order harmonica in the torque ripples before NVM, while there are mostly $9^{th}$ and $12^{th}$ order harmonics after NVM. The noise and vibration profile of the drive has been changed and, with specific tunings of the adaptive gradient method module 204 via objective selector 206, SRM 104's noise and vibration profile can be tailored to virtually any desired effect.

Figure 7:
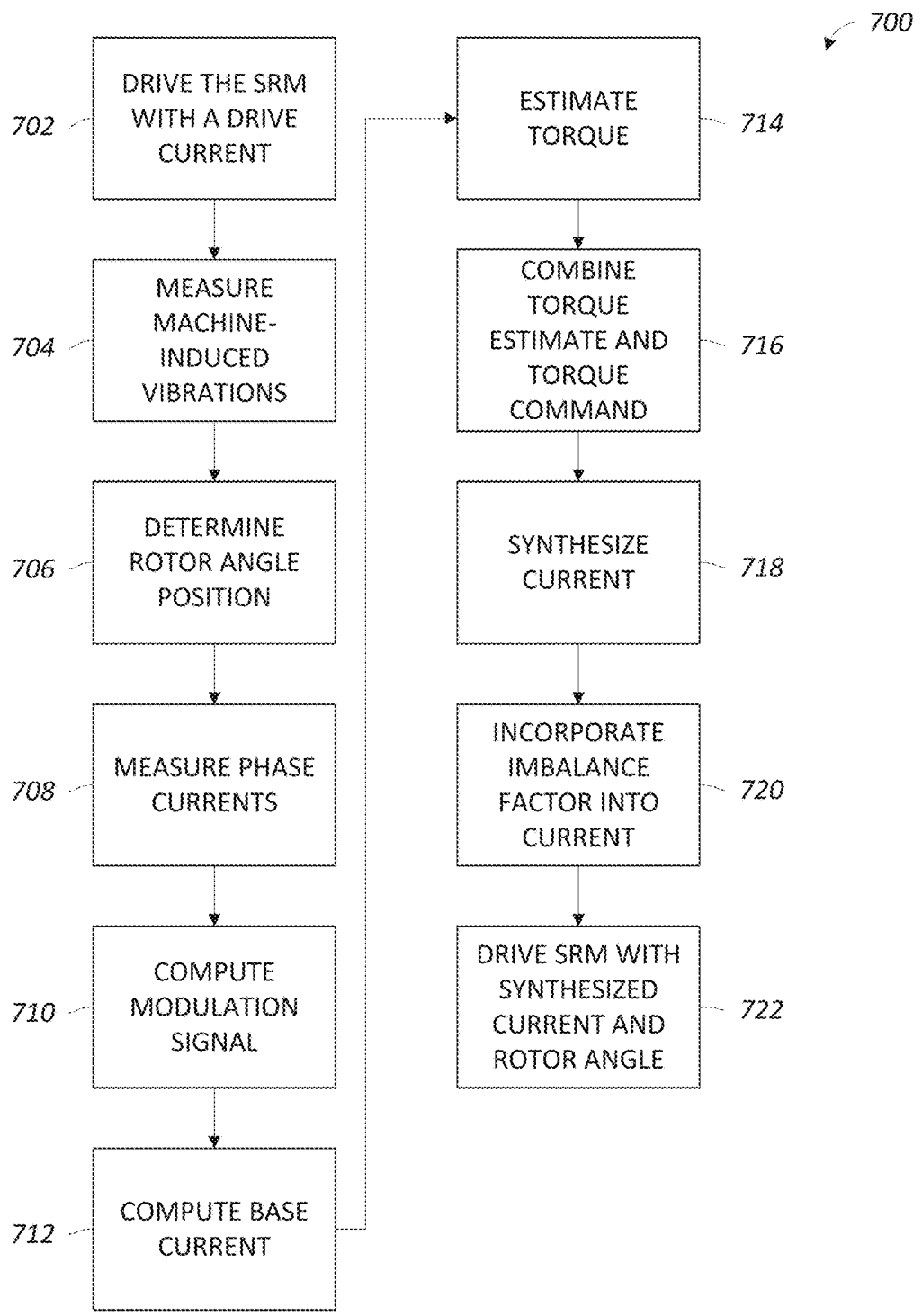
FIG. 7 is a flowchart of the steps taken by an SRM controller implementing the disclosed methods for vibration and noise manipulation for a switched reluctance machine.

Turning attention to FIG. 7, a method 700 of manipulating the vibration and/or noise of a switched reluctance machine that can be implemented within controller 102 will now be described. Method 700 includes first driving SRM 104 with a drive current in step 702 synthesized from a user-commanded torque level, then measuring machine-induced vibrations in step 704. The rotor angle position is determined in step 706 and stator phase currents are measured in step 708. These inputs are fed into controller 102, and a modulation signal is computed in step 710. A base current is determined in step 712, and the actual torque being output by SRM 104 is estimated in step 714. This estimate is combined with the user-commanded torque in step 716, and an initial drive current is synthesized in step 718. In step 720 this drive current is incorporated with a measured machine imbalance factor, and finally the drive current to SRM 104, provided in step 702, is resynthesized to include the rotor's angular position so that the appropriate stator windings are energized.

In step 710, the use of a real-time optimization module includes selecting particular optimization objectives, as described above with reference to real-time optimization module 116. In a preferred embodiment, real-time optimization module 116 is capable of integrating multiple objectives to strike a balance of desired outcomes, e.g. computing a modulation signal that is intended to both mitigate machine-induced vibrations, as well as optimize efficiency. Where multiple objectives are pursued, it should be understood that the resulting modulation signal will typically result in operation of SRM 104 that is something of a compromise, with machine-induced vibrations not being mitigated to their fullest extent and efficiency not being maximized, but rather a best balance between the two objectives. Likewise, more than two objectives can be sought, with the resulting signal an attempted balance between all intended objectives.

A person skilled in the relevant art will understand method 700 as being iterative, inasmuch as controller 102 acts as a closed-loop controller while SRM 104 is in operation. Controller 102 is continually monitoring vibrations, angular positions, and phase currents, and is continually computing corrective factors as long as SRM 104 is in operation. Some of these steps are understood as necessary to drive an SRM 104 in operation; as SRMs are not self-commutating, they require closed-loop controllers for operation. The key inventive concepts lie in step 710, with the use of a real-time optimization module for manipulation, and not just mitigation, of various and selected harmonics, the incorporation of correction for low-order harmonics created by machine imbalances in step 720, and the use of vibration sensors at locations other than immediately upon SRM 104 to reduce and/or manipulate vibrations further down the drive line from SRM 104. For example, it may be desirable to reduce vibrations experienced by load 108 itself, rather than SRM 104, so vibrations may be measured upon load 108. Manipulation/mitigation of load 108 vibrations may, in some circumstances, actually result in an increase in noise and/or vibration in SRM 104, but thereby achieve a desired reduction or manipulation of vibrations in load 108.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A system for controlling a switched reluctance machine drivetrain to modify machine vibrations, comprising:
 a switched reluctance machine drivetrain comprising a switched reluctance machine with a rotor and a load, wherein the rotor is mechanically attached to the load;
 a controller configured to drive the switched reluctance machine using a drive signal, the controller further comprising:
  a real-time optimization module;
  a torque estimator module; and
  a current synthesizer module;
 a vibration sensor configured and disposed to detect machine-induced vibrations from the switched reluctance machine drivetrain; and
 an angular position sensing means configured to detect the angular position of the rotor,
 wherein:
 the real-time optimization module further comprises a harmonic extraction module, a base current estimator, a phase advancement angle module, an electromechanical imbalance factor module, and an adaptive gradient and cost function module,
 the real-time optimization module is configured to receive inputs from the vibration sensor and angular position sensing means, and
 the harmonic extraction module is configured to determine torque harmonic information from the machine-induced vibrations detected by the vibration sensor, and
 the adaptive gradient and cost function module calculates a modulation signal to modify the machine-induced vibrations, and
 the controller is configured to incorporate the modulation signal into the drive signal.

2. The system of claim 1, further comprising an inverter constructed using an asymmetric H-bridge topology, configured to use the drive signal to create a drive current for the switched reluctance machine.

3. The system of claim 2, wherein the inverter implements asymmetric hysteresis current control.

4. The system of claim 1, wherein the vibration sensor comprises a piezo-electric sensor, a microphone, or an accelerometer.

5. The system of claim 1, wherein the switched reluctance machine is configured to operate as a generator or as a motor.

6. The system of claim 1, wherein the current synthesizer module of the controller is configured to incorporate the modulation signal into the drive current.

7. The system of claim 1, wherein the electromechanical imbalance factor module receives a base current from the base current estimator, and computes an electromechanical imbalance factor from the base current and the torque harmonic information.

8. The system of claim 1, wherein the vibration sensor comprises a microphone, and the machine-induced vibrations from the switched reluctance machine drivetrain comprise noise.

* * * * *